Sept. 7, 1926.  
C. CARRETT  
CULINARY ARTICLE  
Filed July 27, 1925
1,599,317
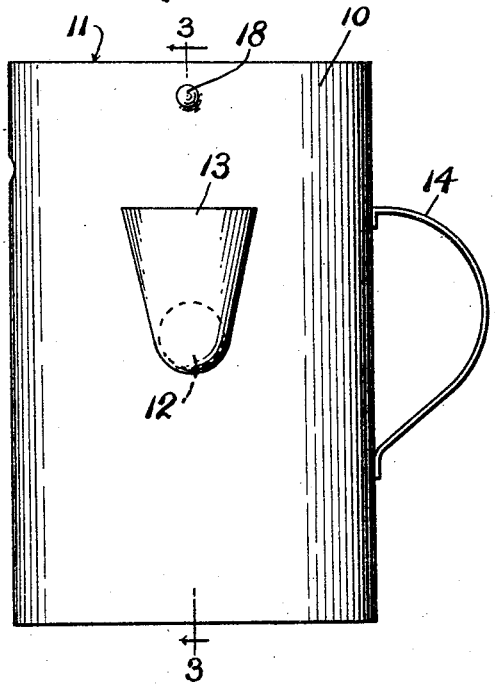
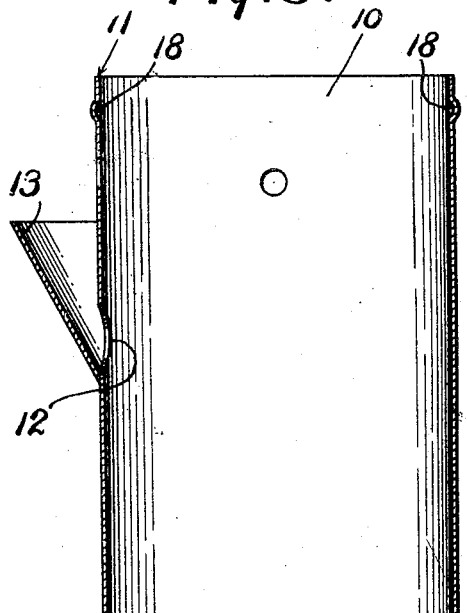
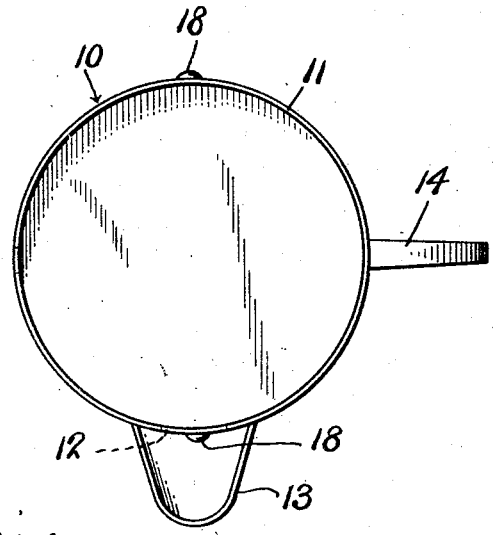
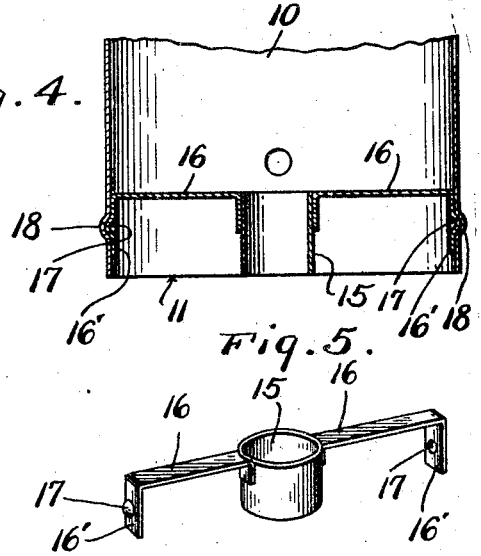
Clara Carrett,  
INVENTOR  
BY *Victor J. Evans*  
ATTORNEY
WITNESS:  
*L. B. James.*

Patented Sept. 7, 1926.

1,599,317

UNITED STATES PATENT OFFICE.

CLARA CARRETT, OF FORT WORTH, TEXAS.

CULINARY ARTICLE.

Application filed July 27, 1925. Serial No. 46,446.

This invention relates to culinary articles and has for an object the provision of an article of this character which is simple in construction, may be cheaply sold and which will combine a measuring cup or container, a vegetable, fruit, cake and biscuit cutter and may be converted into a doughnut cutter.

With the above and other objects in view, the invention further includes the following novel features and details of construction, to be hereinafter more fully described, illustrated in the accompanying drawings and pointed out in the appended claim.

In the drawings:—

Figure 1 is an elevation of the invention.
Figure 2 is a top plan view.
Figure 3 is a sectional view.
Figure 4 is an inverted fragmentary sectional view showing the device arranged as a doughnut cutter.
Figure 5 is a detail perspective view of the attachment.

Referring to the drawings in detail wherein like characters of reference denote corresponding parts, the reference character 10 indicates a cup-like receptacle which may be made of thin metal so that its outer edge 11 will provide a cutter for use in cutting cake, biscuits, vegetables or fruit. In addition, the container is designed for use as a measuring cup and for this purpose is provided with a discharge opening 12 from which extends a discharge spout 13, while a handle 14 is provided for convenience when the device is used as a cup.

In addition to the above uses, the invention may be used as a doughnut cutter and for this purpose provides a short tubular member 15 having arms 16 extending diametrically therefrom. The inner ends of the arms 16 are permanently attached to the tubular member 15 while the outer ends of the arms are right angularly disposed and provide spring fingers 16. These fingers are provided with outwardly disposed raised or offset portions 17 for entrance into sockets 18 provided at diametrically opposite sides of the open end of the container, so that these offset portions 17 frictionally and yieldingly engage the walls of these sockets to removably secure the tubular member concentrically in the cup.

The invention is susceptible of various other changes in its form, proportions and minor details of construction and the right is herein reserved to make such changes as properly fall within the scope of the appended claim.

Having described the invention what is claimed is:—

A device of the character described comprising a cup-shaped container formed of thin metal, a tubular member, arms extending radially from the tubular member and right angular resilient locking fingers at the outer ends of the arms to removably secure the tubular member within the open end of the cup.

In testimony whereof I affix my signature.

CLARA CARRETT.